United States Patent
Roelofs

(10) Patent No.: US 6,765,572 B2
(45) Date of Patent: Jul. 20, 2004

(54) VIRTUAL MODELING BY VOXEL-CLIPPING SHADOW-CAST

(75) Inventor: Gregory Robert Roelofs, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 365 days.

(21) Appl. No.: 09/840,796

(22) Filed: Apr. 23, 2001

(65) Prior Publication Data

US 2002/0154113 A1 Oct. 24, 2002

(51) Int. Cl.[7] ................................................. G06T 15/00
(52) U.S. Cl. ...................................... 345/420; 345/424
(58) Field of Search ................................ 345/419, 420, 345/424, 582, 964

(56) References Cited

U.S. PATENT DOCUMENTS 6,356,272 B1 * 3/2002 Matsumoto et al. ........ 345/582

FOREIGN PATENT DOCUMENTS

WO    WO9206636    4/1992

OTHER PUBLICATIONS

Wang et al. "Volume Sculpting" ACM 1995.*
U.S. S/N 09/724,656, US008072, "GUI Has Library Metaphor Based on Non–Euclidean Geometry", PMC28/701, 545.
U.S. S/N 09/823,460, US018037, "One–To–One Direct Communication".
U.S. S/N 09/777,504, US010024, "Virtual Model Generation Via Physical Components".
Blonde L et al.: "A Virtual Studio for Live Broadcasting: The Mona Lisa Project" IEEE Multimedia, IEEE Computer Society, US, vol 3, No 2, Jun. 1, 1996, pp 18–28.

* cited by examiner

Primary Examiner—Almis R. Jankus
(74) Attorney, Agent, or Firm—Michael E. Schmitt

(57) ABSTRACT

A graphics model of an elephant is made by using bitmap silhouettes of a physical model of an elephant in different orientations to carve away voxels from a voxel block. This gives an intuitively simple tool to enable a user to create graphics representations of physical objects for use in, e.g., virtual environment and in video games.

9 Claims, 4 Drawing Sheets

VIRTUAL MODELING BY VOXEL-CLIPPING SHADOW-CAST

FIELD OF THE INVENTION

The invention relates to an image processing system and method, especially, but not exclusively, within the context of toys and video games.

BACKGROUND ART

Video games and graphics games and other computer-related entertainment software applications have become increasingly more widespread, and are currently being used even on mobile phones. In multi-player games or applications, players use animated graphical representations, known as avatars, as their representatives in a virtual environment. Dedicated devices are being marketed for electronic pet toys, e.g., Tamaguchi: a rearing game, wherein the user has to take care of a virtual animal rendered on a display monitor.

SUMMARY OF THE INVENTION

The creation of virtual interactive worlds with graphics creatures and objects is an art form that does not lend itself well to being masterfully applied by a layperson, let alone by a child. Nevertheless, software applications that enable a layperson or a youngster to create such creatures and objects would be welcomed, as they help to give a person control over previously unattainable aspects of electronic worlds. The inventor therefore proposes a system and tools to enable to create electronic objects and creatures in a user-friendly and easily understood manner.

The invention provides a tool to map a 3-D physical object onto a 2-D outline or silhouette in electronic format. For example, the 3-D object is illuminated and its shadow is cast onto an array of light-sensors. The light sensors enable to translate the shadow into a 2-D bitmap. Rotating the 3-D object gives another shadow and another bitmap. Preferably, each bitmap is associated with information about a relative orientation of the light source, the physical object and the sensor array. The collection of bitmaps and relative orientations enables to reconstruct a 3-D graphics representation of the physical object's shape. For example, each voxel is removed from a voxel space that does not belong to a cylinder with a specific bitmap as cross-section, when the bitmap is projected onto the voxel space in its proper orientation.

This process works acceptably well for an object whose surface is convex anywhere. However, a physical object with a concave portion, e.g., an apple from which someone has taken a bite, or a teacup, may give rise to a distorted graphics representation. This is due to the concave portions being masked in all orientations of the object by portions of the physical object surrounding the concave part. Therefore, the inventor proposes to provide software tools to enable the user to deform the 3-D graphics object so as to refine the surface: create concave portions, thru-holes, outgrowths, etc. The graphics object is preferably assigned a coherence: when the user deforms the graphics object by displacing or otherwise modifying its surface (the equivalent of pulling or pushing in the physical world) at a certain location the neighborhood of that location is deformed as well to ensure continuity of the model is ensured. For example, a virtual elephant is created by first using shadowgrams of (a model of) an elephant to get an intermediate graphics object, and then the voxels of the intermediate object are deformed to get a closer approximation of the elephant's shape or of the shape of a totally different virtual creature.

Assume that the graphics model is to represent an animated articulated creature: a humanoid, a quadruped, an arachnid, a penguinoid, etc., etc. Preferably, the software tools comprise pre-defined skeletons or matchstick figures onto which the graphics model can be draped, possibly after some resealing. The model is attached to the skeleton, e.g., at the latter's extremities and joints, by defining that certain voxels of the model move with specific points of the skeleton. The skeleton is movable using pre-defined scripts for, e.g., walking, flying, jumping, turning around, etc. Due to the coherence and elasticity defined for the graphics model, the surface of it is then allowed to follow the movement of the skeleton in a more natural way.

If the physical object has one or more axes or one or more planes of symmetry, fewer bitmaps are needed to describe the object. Symmetry operations then reconstruct the graphics object from the part of the scanned physical object.

The shadow casting method can be used to separately create multiple graphics objects for a single compound graphics object. For example, a graphics model of a steam locomotive is created by shadow-casting basic components (e.g., the spoked wheels, the cab, the boiler and firebox) in combination with using pre-defined graphics elements (cubes, spheres, rods, cylinders) and assembling the graphics objects in a virtual environment.

If 3-D is not required in the virtual environment, the physical object is mapped onto a single bitmap using shadow-casting as described above in order to create a 2-D silhouette.

Texture mapping can be applied to the eventual graphics model to give it a specific appearance.

A user may create the bitmaps him/herself, e.g., as based on captured silhouettes, and submit the set of bitmaps to a service on the Internet. The service converts the set into a 3-D graphics model in terms of voxels or another representation, and sends it back to the user for refining or personalizing, or ready for use in a virtual environment or as decoration. The service may also take care of the refining according to, e.g., a specification submitted by the user, and of providing a script for animation as discussed above, etc.

Accordingly, the inventor provides a relatively inexpensive software tool to create graphics objects from real physical objects, by starting with bitmaps for an intermediate graphics model made by shadowcasting, and then by modifying its surface using elastic or inelastic deformation or chipping or drilling away voxels, texture mapping, coloring, etc. The tool is relatively easy to use, and is especially interesting as a toy, as entertainment, for educational purposes or for rapid prototyping. The tool is low-cost by virtue of, among other things, adequate processing power of commercially available PC's.

Also, instead of shadow-casting equipment, the user takes pictures of the physical object using a digital camera, and converts these digital pictures into bitmap silhouettes using a graphics editing software program or a photo editing software program. The user then has to specify to some degree the relative angular position of the different silhouettes so as to associate the viewpoints of the silhouettes with the relative orientation of the object with respect to the camera. For this purpose, a tripod and a paper target with predefined angles can be used, for example.

BRIEF DESCRIPTION OF THE DRAWING

The invention is described in further detail below, by way of example, and with reference to the drawing, wherein.

Throughout the figures, same reference numerals indicate similar or corresponding features.

DETAILED DESCRIPTION

As discussed above, an aspect of the invention relates to a software application for creating a graphics object. The application comprises an input for receiving a plurality of respective bitmaps. Each bitmap has a respective index and comprises pixels with one of first and second pixel values (say, black and white). The application has a discriminator operating on a domain of multiple voxels. The discriminator determines for each respective bitmap which specific ones of the voxels are to be assigned to a voxel representation of the object under control of the respective index and the pixel values of the respective bitmap. The application may comprise a software tool to enable a user to modify a shape of the graphics object or for mapping a texture on the graphics object. The application may also comprise a script for animation of a pre-defined graphical entity, and a software tool for combining the entity with the graphics object, the latter covering the entity as a skin. This enables animation of the object through the script.

Another aspect of the invention relates to a peripheral device for use with a PC. The device comprises an array of light sensors for creating a bitmap for further processing on the PC, and a reference system for creating respective bitmaps of a physical object in respective orientations of the object with respect to the reference system. The respective orientations are represented by respective indices associated with the respective bitmaps. The device cooperates with the software application discussed earlier.

Yet another aspect relates to a service, e.g., on the Internet to enable a person to make a graphics model. The person is enabled to submit to the service provider a set of bitmaps, each with multiple pixels that have one of two pixel values and with information about the relative orientation with respect to one another. The bitmaps are used to mold a block of voxels into a graphics 3-D model as described.

Figure 1:
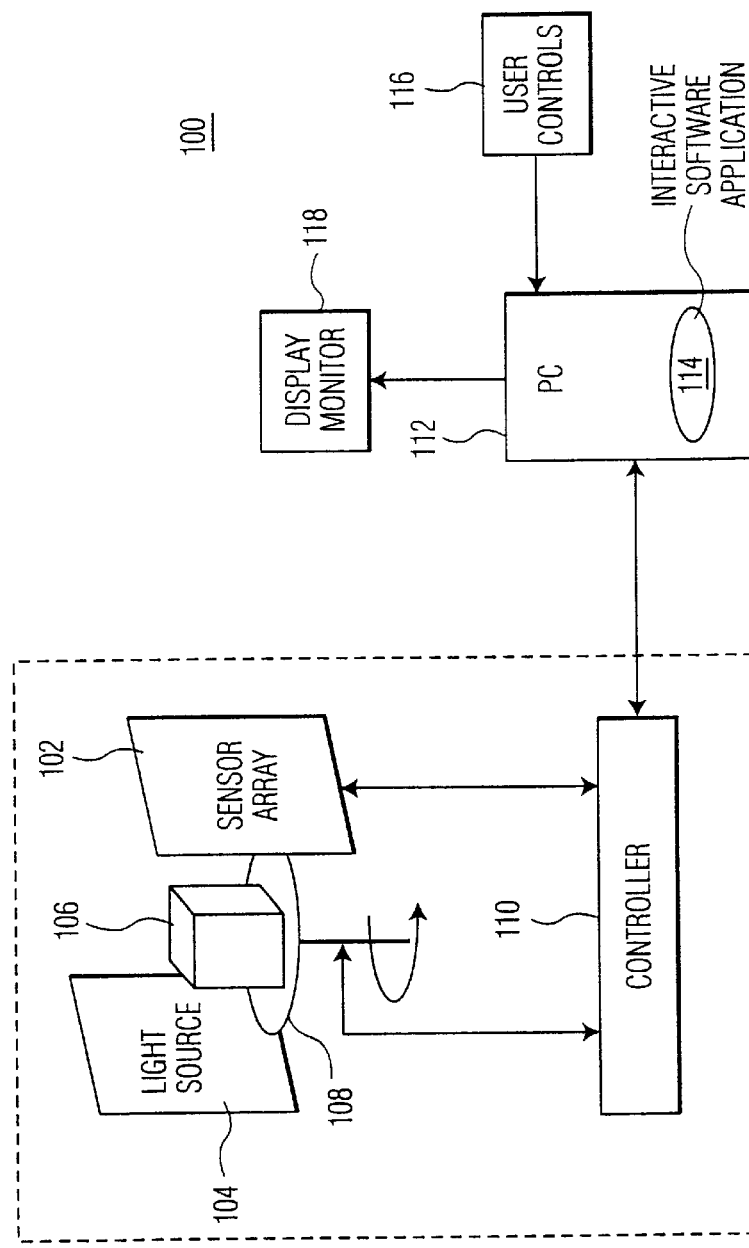
FIG. 1 is a block diagram of a system in the invention.

FIG. 1 is a block diagram of a system 100 in the invention. System 100 comprises a sensor 102 that is sensitive to light transmitted by a light source 104. Light that is blocked by a physical object 106 located between sensor 102 and source 104 causes a shadow on sensor 102. Sensor 102 preferably comprises an array of light-sensitive cells so that a high or low response of an individual cell to the incident light or the light's absence, together with the cell's location in the array, determines the binary value of a pixel in a bitmap of the physical object.

Preferably, sensor 102 cooperates with a reference system 108 to allow to make different bitmaps of object 106 in different orientations. For example, reference system 108 comprises a support for object 106 and a controller 110. The support turns object 106 over an angle, under control of controller 110 before making the next bitmap. The angle is preferably user-programmable, at least qualitatively. For example, the user can set the desired angle per bitmap to a certain value on a scale from very small to large. The set of angle/bitmap pairs thus enables one to order the bitmaps according to orientation.

Controller 110 communicates the bitmap data to PC 112 where the data is processed under control of a software application 114 and, possibly, user controls 116. The bitmap data gets used to shape a 3-D graphics object from a block of voxels by removing the voxels that are not covered by the black pixels of at least one of the bitmaps for the various orientations. A feedback loop can indicate to the user that a further bitmap is needed in specific orientations to resolve ambiguities. The user can scale the object, control its texture through a texture mapping procedure, and modify the shape as discussed above. The results and the processing is displayed on a display monitor 118.

Instead of rotating physical object 106 between the stationary configuration of sensor 102 and source 104, object 106 can be held stationary and the sensor-source pair can be rotated around object 102. FIG. 1 suggests a single axis of rotation, or, in other words, bitmaps taken at certain angles along a circle. It is clear that object 106 can be represented by a cluster of bitmaps taken from various points that not all lie on the same circle but, e.g., on the surface of another geometric form, e.g., a sphere. In the latter case, each bitmap is indexed using two parameters, e.g., the angles $\theta$ and $\phi$ used in a spherical coordinate system. Controller 110 controls then the rotation axes and/or orientation of the planes of light source 104 and sensor 102.

As the system is especially interesting for entertainment or as a toy, a high accuracy is not a main issue initially. For example, the light rays from source 104 may not be parallel to one another, thus causing a boundary shadow zone wherein the light intensity varies gradually from a maximum to a minimum; sensor 102 has only a finite resolution; some objects are not easily mapped out using the cast shadows, etc. However, the intermediate virtual model that emerges from the synthesis of the bitmap data is much nearer to a meaningful end result than providing the user with drawing tools and let him/her start from scratch. Light source 104 can be a source with collimated beams, a single light source with a Fresnel lens or a mechanically mounted laser or other collimated light source can be used to reduce the boundary shadow zone. Sensor 102 can comprise a flat-panel sensor array with means to block stray light, or a lens gathering light and concentrating it on a CCD or CMOS array (as in an electronic camera).

As mentioned earlier, software tools are provided for refining the intermediate model, preferably in a way that is intuitively simple: holes can be drilled using a virtual drill; chips can be removed using a virtual chisel or a virtual ice-cream scoop (the inventor's favorite); a virtual lathe or router can be used; by controlling the elasticity of the model re-shaping is done by pushing and pulling, etc., all in the virtual environment.

Figure 2A:
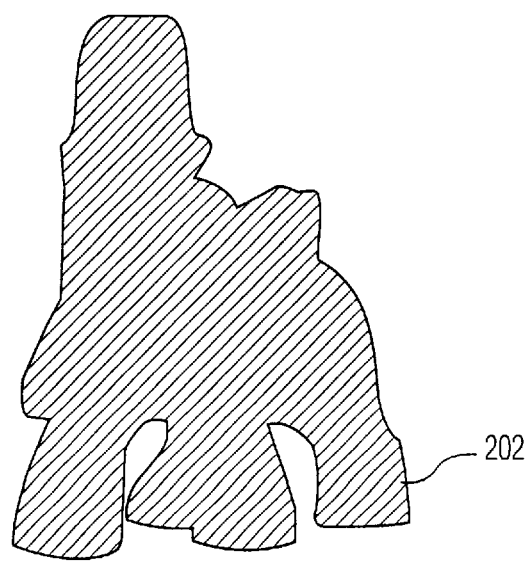
FIG. 2 illustrates silhouettes of a physical model of an elephant in various orientations.
Figure 2B:
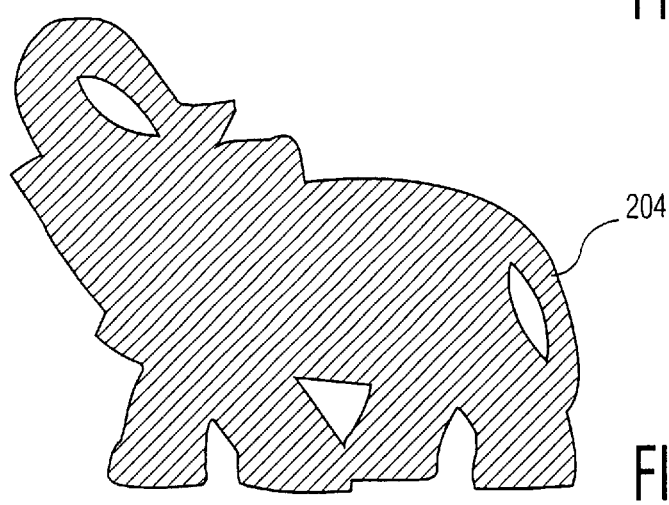
Figure 2C:
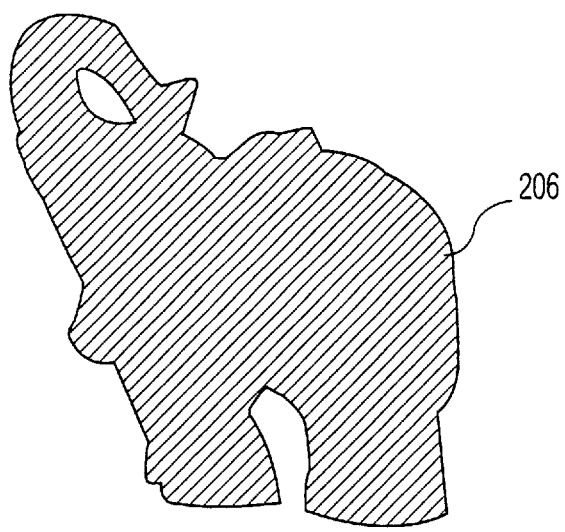

FIG. 2 illustrates silhouette bitmaps 202, 204 and 206 of a physical model of an elephant in various orientations with respect to sensor 102.

Figure 3A:
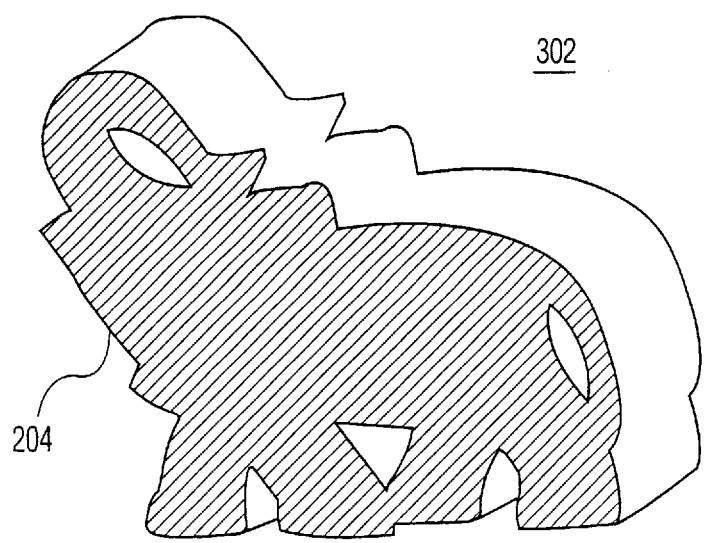
FIG. 3 illustrates a step in the process of creating a virtual elephant.
Figure 3B:
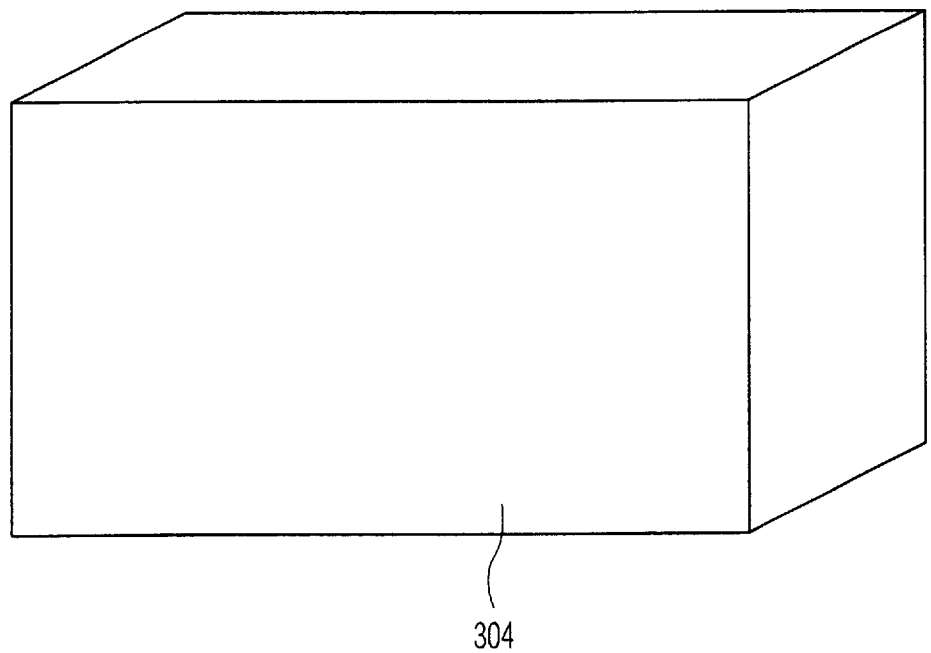

FIG. 3 illustrates the result 302 of applying bitmap 204 to a block 304 of voxels, block 304 having finite dimensions. The result is a cylinder having the cross-section of the elephant's silhouette.

Figure 4:
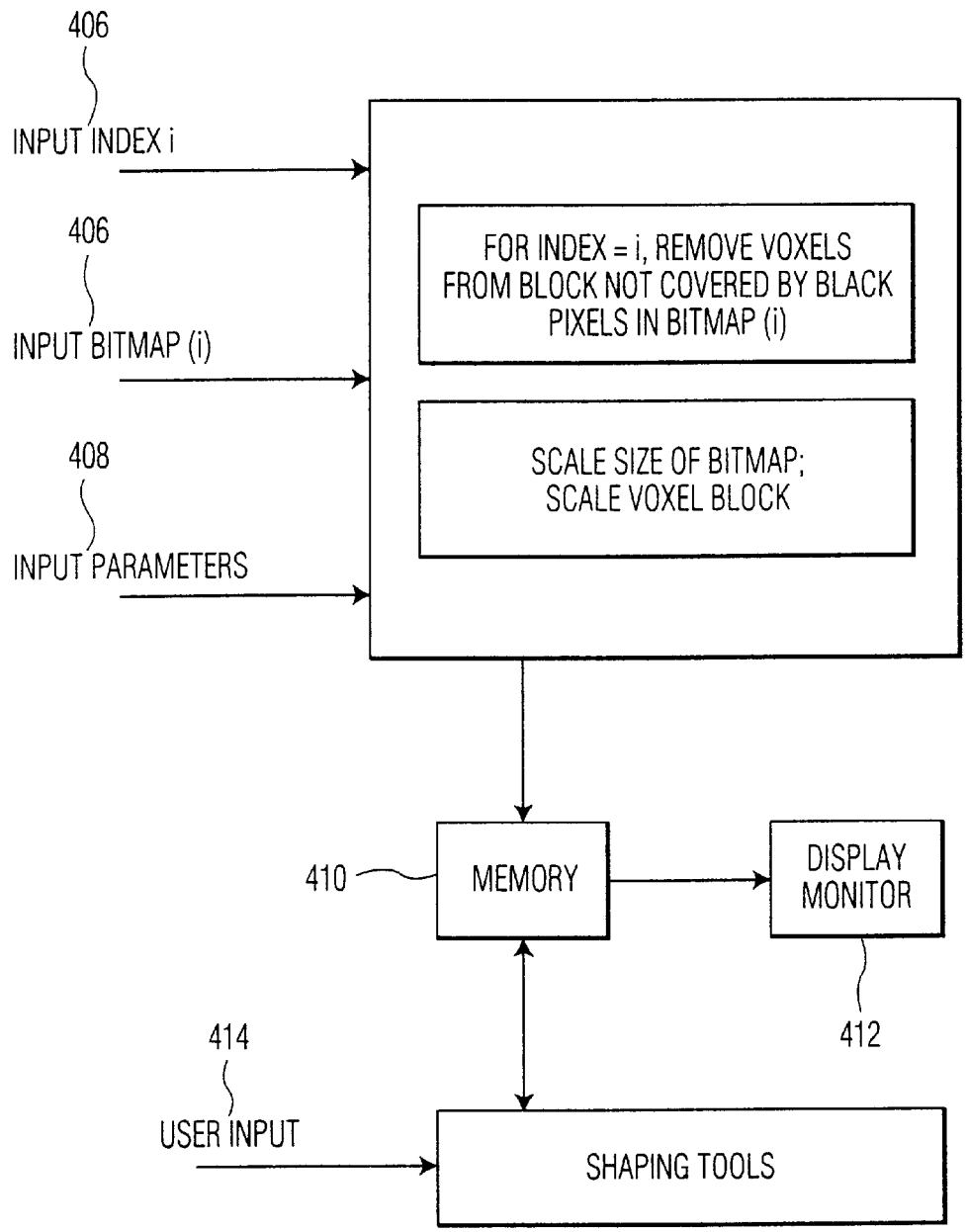
FIG. 4 illustrates aspects of a software application.

FIG. 4 illustrates what has been discussed above with regard to the software application 114. Application 114 comprises a discriminator 402 that carries out the carving of block 304. An example of the carving procedure is the following. For each index i, i=1, 2, ..., N, remove voxels from the block not covered by the black pixels in the bitmap corresponding to index i, "i" being the running label that enables ordering the bitmaps according to their respective orientation (e.g., viewing angle). Discriminator 402 may also be used to compute the intersection of the cylinder, e.g., cylinder 302, with the voxel space. Some voxels may belong only partly to the intersection and proper filtering is advisable to avoid jagged surfaces in the virtual model.

Input is provided at inputs 406 for the bitmaps and their associated indices. Input parameters may be provided at input 408 by the user, e.g., for scaling purposes. The results of the voxel carving gets stored in a memory 410 and displayed on a display monitor 412. Application 114 comprises shaping tools for the user to carve away voxels and otherwise modify the result of the bitmap under user control at input 414. The user gets visual feedback of these operations via monitor 412.

The creation process itself is preferably accompanied with special graphical and or sound effects when used as a toy or for entertainment. For example, when using a bitmap as a carving tool to remove from the block of voxels all those that are not covered by the bitmap's silhouette, the removal is illustrated by a rain of chips spouted from the appropriate places of the block, and by a sound of fast chiseling or explosions. As an aside: the Mt. Rushmore National Monument in the Black Hills was sculpted with explosives by Gutzon Borglum to an accuracy of a few inches. Similarly, the nearby Crazy Horse National Monument designed by Korzczak Ziolkowski is being sculpted using explosives.

Incorporated by reference are the following patent documents:

U.S. Ser. No. 09/724,656 filed Nov. 28, 2000 for Greg Roelofs for GUI HAS LIBRARY METAPHOR BASED ON NON-EUCLIDEAN GEOMETRY. This document relates to a data processing system with a GUI that enables the user to interact with a virtual environment. The environment has a graphical representation of a storage based on a library metaphor. The storage is being used to graphically archive information items. The virtual environment has a path-dependent geometry. This allows modification of the storage to add additional items without visually disrupting the organization of the items stored previously.

U.S. Ser. No. 09/777,504 filed Feb. 5, 2001 for Greg Roelofs for VIRTUAL MODEL GENERATION VIA PHYSICAL COMPONENTS. This document relates to a system for creating a virtual model of a physical structure. The system comprises a baseboard; at least one sensor providing sensor data; at least one building component capable of being sensed by the sensor and mountable on the baseboard; a computer interfaced with and receiving data from the sensor, for determining the position and dimensions of each component mounted on the baseboard based on the sensor data; and wherein the computer creates a virtual model to be displayed on a computer display of a structure composed of each of the components mounted on the baseboard based on the position and dimensions of each of the components. The building components comprise electrical contact points having electrical signatures. The sensor is a circuit board connected to a power source and comprises a voltmeter, an ammeter, a switching network and a processor receiving data from the voltmeter and for controlling the voltmeter, ammeter and the switching network. The sensor senses the electrical signature, location and orientation on the circuit board of each building component.

U.S. Ser. No. 09/823,460 filed Mar. 30, 2001 for Nancy Kidney et al., for ONE-TO-ONE DIRECT COMMUNICATION. This document relates to graphically representing the progress of transferring an electronic object from a sending handheld to a receiver as an object gradually sliding out of view on the display of the sender and gradually sliding into view on the display of the receiver. A gravity sensor in the handheld is used to determine the transmission's data rate. This visual feedback is an ergonomic feature for, e.g., electronic toys.

What is claimed is:

1. A software application for creating a graphics object, the application comprising:
    an input for receiving a plurality of respective bitmaps, each bitmap having a respective index and comprising pixels with one of first and second pixel values;
    a discriminator operating on a domain of multiple voxels to determine for each respective bitmap which specific ones of the voxels to assign to a voxel representation of the physical object under control of the respective index and the pixel values of the respective bitmap;
    a script for animation of a pre-defined graphical entity; and
    a software tool for combining the entity with the graphics object for enabling animation of the object through the script.

2. The application of claim 1, comprising a software tool to enable a user to modify a shape of the graphics object.

3. The application of claim 1, comprising a software tool for mapping a texture on the graphics object.

4. A peripheral device for use with a PC for detecting and communicating to the PC a shadow of a physical object in a form of a bitmap, the device comprising;
    an array of light sensors comprising a plurality of light sensors; and
    a light source, the array of light sensors and the light source being spaced-apart a predetermined distance suitable to receive the physical object therebetween such that the shadow of the physical object is cast onto the array of light sensors, wherein each light sensor is adapted to communicate one of first and second pixel values to the PC based upon whether the light sensor is in the shadow.

5. The device of claim 4, comprising a reference system for creating respective bitmaps of the physical object in respective orientations of the physical object with to the reference system.

6. The device of claim 5, for cooperation with a software application for creating a graphics object, the application comprising:
    an input for receiving a plurality of respective bitmaps, each having a respective index representative of the respective orientations and comprising pixels with one of the first and second pixel values; and
    a discriminator operating on a domain of multiple voxels to determine for each respective bitmap which specific ones of the voxels to assign to a voxel representation of the physical object under control of the respective index and the pixel values of the respective bitmap.

7. A data processing system comprising:
    a device comprising an array of light sensors and a light source, the array of light sensors comprising a plurality of light sensors, the array of light sensors and the light source being spaced-apart a predetermined distance suitable to receive a physical object therebetween such that the shadow of the physical object is cast onto the array of light sensors, wherein each light sensor is adapted to communicate one of first and second pixel values to the PC based upon whether the light sensor is in the shadow; and a software application for creating a virtual object, the application comprising:
an input for receiving a plurality of respective bitmaps, each having a respective index and comprising pixels with the one of first and second pixel values; and
a discriminator operating on a domain of multiple voxels to determine for each respective bitmap which specific ones of the voxels to assign to a voxel representation of the physical object under control of the respective index and the pixel values of the respective bitmap.

8. A method of making a graphics object, the method comprising:
forming one or more respective bitmaps, each having a respective index and comprising pixels with one of first and second pixel values;
operating on a domain of multiple voxels to determine for each respective bitmap which specific ones of the voxels to assign to a voxel representation of a physical object under control of the respective index and the pixel values of the respective bitmap;
scripting animation of a pre-defined graphical entity; and
combining the pre-defined graphical entity with the voxel representation for enabling animation of the voxel representation through the script.

9. A method of making a graphics object, the method comprising:
detecting and communicating to a PC a shadow of a physical object in a form of a bitmap, the physical object having an object dimension, using a device comprising:
an array of light sensors comprising a plurality of light sensors, the array of light sensors having an array dimension equal to or larger than the object dimension; and
a light source, the array of light sensors and the light source being spaced-apart a predetermined distance suitable to receive the physical object therebetween such that the shadow of the physical object is cast onto the array of light sensors, wherein each light sensor is adapted to communicate one of first and second pixel values to the PC based upon whether the light sensor is in the shadow; and
operating on a domain of multiple voxels to determine for each respective bitmap which specific ones of the voxels to assign to a voxel representation of the physical object under control of the respective index and the pixel values of the respective bitmap.

* * * * *